US009398520B2

(12) United States Patent
Umatt et al.

(10) Patent No.: US 9,398,520 B2
(45) Date of Patent: Jul. 19, 2016

(54) SYSTEM SEARCH FOR FULL SERVICE WHILE ON A CELL WITH LIMITED SERVICE

(75) Inventors: Bhupesh Manoharlal Umatt, Poway, CA (US); Kiran Chikkappa, San Diego, CA (US); Vineet Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1180 days.

(21) Appl. No.: 11/865,986

(22) Filed: Oct. 2, 2007

(65) Prior Publication Data

US 2009/0088154 A1   Apr. 2, 2009

(51) Int. Cl.
*H04W 4/00* (2009.01)
*H04W 48/16* (2009.01)
*H04W 36/00* (2009.01)
*H04W 68/00* (2009.01)

(52) U.S. Cl.
CPC ............. *H04W 48/16* (2013.01); *H04W 68/00* (2013.01)

(58) Field of Classification Search
CPC ... H04W 48/16; H04W 600/00; H04W 48/18; H04W 36/30
USPC ......... 455/434, 435.1, 435.2, 426.1, 436, 437
See application file for complete search history.

(56) References Cited

U.S. PATENT DOCUMENTS

| 5,794,146 A | 8/1998 | Sevcik et al. | |
|---|---|---|---|
| 6,075,988 A * | 6/2000 | Anderson et al. | 455/434 |
| 7,069,026 B2 * | 6/2006 | McClure | 455/456.3 |
| 7,162,239 B2 | 1/2007 | Tohono | |
| 7,340,251 B1 * | 3/2008 | McClure | 455/434 |
| 7,664,069 B2 * | 2/2010 | Bae et al. | 370/329 |
| 2004/0043798 A1 * | 3/2004 | Amerga et al. | 455/574 |
| 2005/0164683 A1 * | 7/2005 | Roberts et al. | 455/412.2 |
| 2006/0126577 A1 | 6/2006 | Yano et al. | |

(Continued)

FOREIGN PATENT DOCUMENTS

| CN | 1372776 A | 10/2002 |
|---|---|---|
| CN | 99815228.5 | 10/2007 |

(Continued)

OTHER PUBLICATIONS

Digital cellular communications system (phase 2+) (3GPP TS 143. 022 version 7.2.0,Release 7); ETS TS 143 022, V7.2.0, Jun. 2007.*

(Continued)

*Primary Examiner* — Muthuswamy Manoharan
(74) *Attorney, Agent, or Firm* — Dalei Dong (57) ABSTRACT

Techniques for performing system searches to find a suitable cell to receive full service while camped on a cell with limited service are described. Initially, a user equipment (UE) may camp on a first cell and receive limited service. The UE may perform a system search in background to find a suitable cell to receive full service. By performing the system search in background, the UE can receive paging messages and perform cell reselection and/or other tasks while the system search is pending and may also be able to obtain limited service with little or no delay when requested by a user. The UE may suspend the system search prior to each paging occasion, receive paging messages applicable for the UE, and then resume the system search. The UE may receive a request for limited service (e.g., emergency call), suspend or abort the system search, and obtain the requested limited service.

34 Claims, 7 Drawing Sheets

(56) References Cited

U.S. PATENT DOCUMENTS

| | | | |
|---|---|---|---|
| 2008/0139241 A1* | 6/2008 | Kiyomoto | 455/552.1 |
| 2008/0220772 A1* | 9/2008 | Islam et al. | 455/432.2 |
| 2012/0015648 A1* | 1/2012 | Roberts et al. | 455/426.1 |

FOREIGN PATENT DOCUMENTS

| | | | | |
|---|---|---|---|---|
| GB | 2413737 | * | 11/2005 | H04Q 7/32 |
| JP | 10084572 | A | 3/1998 | |
| JP | 10341485 | A | 12/1998 | |
| JP | 11069409 | A | 3/1999 | |
| JP | 11196445 | A | 7/1999 | |
| JP | 2000152305 | A | 5/2000 | |
| JP | 2000312371 | | 11/2000 | |
| JP | 2001157245 | A | 6/2001 | |
| JP | 2006173861 | A | 6/2006 | |
| WO | 0059255 | | 10/2000 | |

OTHER PUBLICATIONS

3GPP TS 25.304 v6.9.0 (Mar. 2006), release 6 UE equipment in idle mode and procedures for reselection in connected mode.*
3GPP TS 43.022 "Functions Related to Mobile Station in Idle Mode and Group Receive Mode" Sep. 2006.
3GPP TS 25.304 Section 4.3.
"Digital cellular telecommunications system (Phase 2+); Functions related to Mobile Station(MS) in idle mode and group receive mode (3GPP TS 43.022 version 7.2.0 Release 7); ETSI TS 143 022" ETSI Standard, LIS, Sophia Antipolis Cedex, France, vol. 3-G1, n.
International Search Report—PCT/US08/078487, International Search Authority—European Patent Office—Feb. 24, 2009.
Written Opinion—PCT/US08/078487, International Search Authority—European Patent Office—Feb. 24, 2009.
3GPP TS 25.331 "Radio Resource Control (RRC); Protocol Specification" Release Jun. 7, 2006.
Taiwan Search Report—TW097137964—TIPO—Feb. 19, 2012.

* cited by examiner

SYSTEM SEARCH FOR FULL SERVICE WHILE ON A CELL WITH LIMITED SERVICE

BACKGROUND

I. Field

The present disclosure relates generally to communication, and more specifically to techniques for searching for wireless communication networks.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may include many Node Bs (or base stations) that can support communication for many user equipments (UEs), e.g., cellular phones. Upon power up or loss of coverage, a UE may perform a system search in order to find a suitable cell from which the UE can receive communication services. The term "cell" can refer to a Node B and/or its coverage area depending on the context in which the term is used. A "suitable cell" is a cell on which the UE may camp on to obtain full service. A cell may be deemed as suitable if it meets certain criteria. Full service may also be referred to as normal service and may include all communication services available to the UE based on its service subscription. If a suitable cell is found, then the UE may perform registration with the cell, if necessary. The UE may then "camp" on the suitable cell if the UE is in an idle mode and not actively communicating with the cell.

If a suitable cell is not found by the system search, then the UE may select any acceptable cell. An "acceptable cell" is a cell on which the UE may camp on to obtain limited service, which may include only emergency calls. A cell may be deemed as acceptable if it satisfies certain conditions. If the UE is camped on an acceptable cell, then it is desirable for the UE to periodically perform system searches to find a suitable cell from which the UE can receive full service.

SUMMARY

Techniques for efficiently performing system searches to find a suitable cell to receive full service while camped on a cell with limited service are described herein. Initially, a UE may camp on a first cell and receive limited service via the first cell. The UE may perform a system search in background to find a suitable cell to receive full service. By performing the system search in background, the UE can perform other tasks and obtain limited service with little or no delay when requested by a user. The UE may continue to receive paging messages applicable for the UE while performing the system search in background. The UE may perform the system search over a time period covering multiple paging occasions in which the UE might receive paging messages. The UE may suspend the system search prior to each paging occasion, receive paging messages applicable for the UE, and then resume the system search.

The UE may receive a request for limited service (e.g., to originate an emergency call) while the system search is pending. The UE may suspend or abort the system search in response to the request and may obtain the requested limited service (e.g., originate the emergency call). The UE may receive a paging message with system information indicating that the first cell has become suitable to receive full service. The UE may then attempt registration via the first cell. Conversely, the UE may receive a paging message with system information indicating that the first cell has become barred. The UE may then attempt to find another cell to receive service and may skip making signal strength measurements for the frequency channel of the first cell.

Various aspects and features of the disclosure are described in further detail below.

DETAILED DESCRIPTION

The techniques described herein may be used for various wireless communication networks such as CDMA, TDMA, FDMA, OFDMA and SC-FDMA networks. The terms "network" and "system" are often used interchangeably. A CDMA network may implement a radio access technology such as Universal Terrestrial Radio Access (UTRA), cdma2000, etc. UTRA includes Wideband-CDMA (W-CDMA), Low Chip Rate (LCR), etc. cdma2000 covers IS-2000, IS-95, and IS-856 standards. A TDMA network may implement a radio access technology such as Global System for Mobile Communications (GSM). An OFDMA network may implement a radio access technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. These various radio access technologies and standards are known in the art. UTRA, E-UTRA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the techniques are described for a Universal Mobile Telecommunication System (UMTS) network that utilizes W-CDMA and a GSM network. Also for clarity, 3GPP terminology is used in much of the description below.

Figure 1:
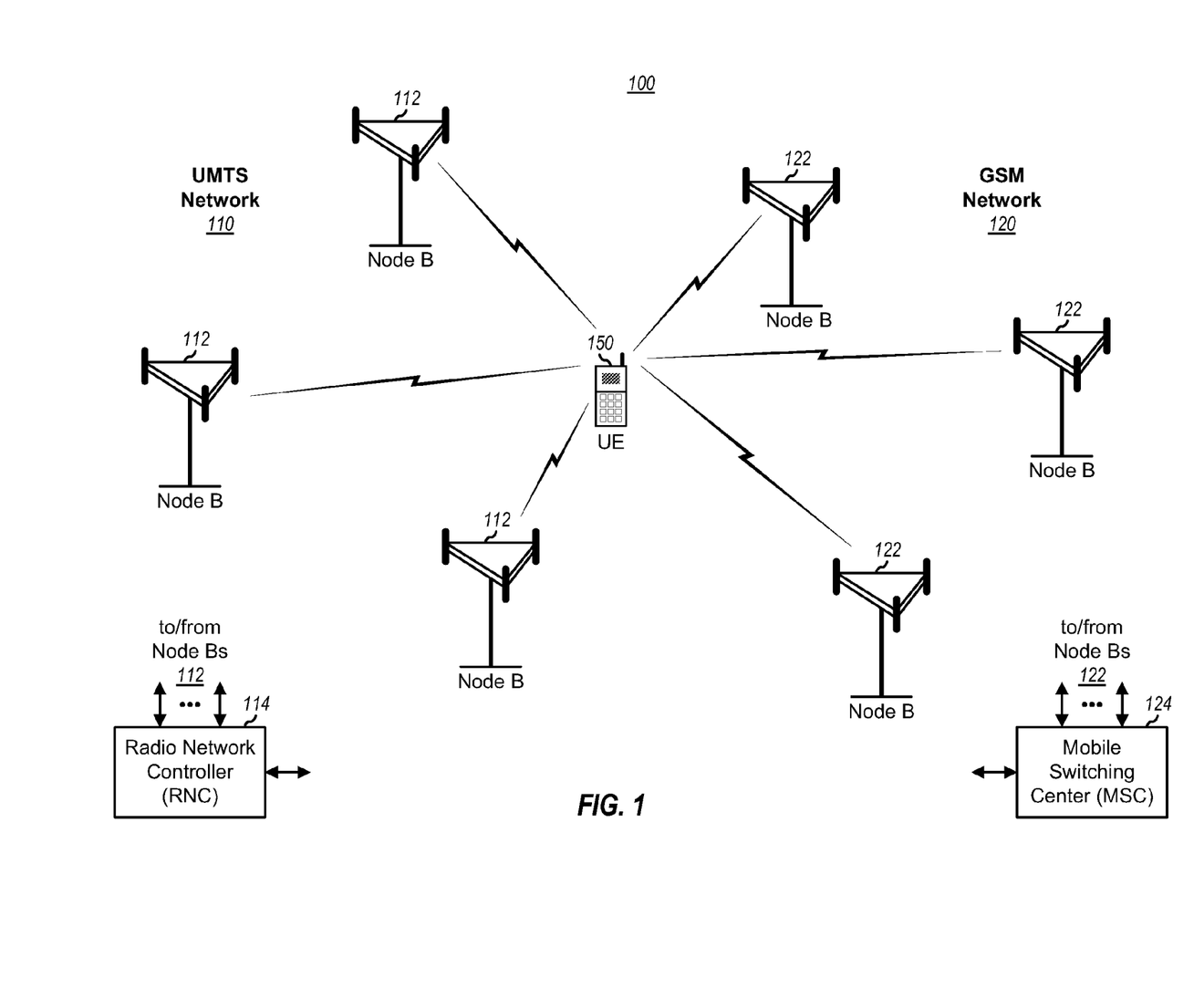
FIG. 1 shows a deployment of a UMTS network and a GSM network.

FIG. 1 shows a deployment 100 that includes a UMTS network 110 and a GSM network 120. UMTS network 110 includes Node Bs 112 that communicate with UEs within the coverage area of the UMTS network. A radio network controller (RNC) 114 couples to Node Bs 112 and provides coordination and control for these Node Bs. GSM network 120 includes Node Bs 122 that communicate with UEs within the coverage area of the GSM network. A mobile switching center (MSC) 124 couples to Node Bs 122 and provides coordination and control for these Node Bs. In general, a Node B is a fixed station that communicates with the UEs and may also be referred to as a base station, a base transceiver station (BTS), an evolved Node B (eNode B), an access point, etc. RNC 114 may communicate with MSC 124 to support inter-working between the UMTS and GSM networks.

A UE 150 may be capable of communicating with just UMTS network 110, or just GSM network 120, or both UMTS network 110 and GSM network 120. UE 150 may also be capable of communicating with other wireless networks, e.g., a cdma2000 network. UE 150 may be stationary or mobile and may also be referred to as a mobile station, a mobile equipment, a terminal, an access terminal, a subscriber unit, a station, etc. UE 150 may be a cellular phone, a personal digital assistant (PDA), a wireless modem, a wireless communication device, a handheld device, a laptop computer, etc. UE 150 may communicate with one or more Node Bs on the downlink and/or uplink at any given moment. The downlink (or forward link) refers to the communication link from the Node Bs to the UEs, and the uplink (or reverse link) refers to the communication link from the UEs to the Node Bs.

UMTS network 110 and GSM network 120 may belong in the same or different public land mobile networks (PLMNs). A PLMN may include one or more wireless networks, e.g., one or more UMTS networks and/or one or more GSM networks. A PLMN may be uniquely identified by a PLMN ID, which may comprise a Mobile Country Code (MCC) and a Mobile Network Code (MNC). The UMTS networks and GSM networks for a given PLMN may have overlapping or non-overlapping coverage areas. Multiple PLMNs may also be deployed by different service providers in a given geographic area.

UE 150 may be provisioned with a list of preferred PLMNs from which the UE may receive service. This preferred list may be provisioned by a service provider with which UE 150 has a service subscription. The preferred list normally includes a home PLMN (HPLMN) and other PLMNs for which the service provider has roaming agreements. The preferred list may include a number of entries, e.g., one entry for each PLMN. Each entry may include PLMN ID information (e.g., MCC and MNC), frequency channel and band information, and/or other pertinent information used to acquire an associated PLMN. The preferred list may be stored in a Subscriber Identity Module (SIM), a Universal SIM (USIM), or some other non-volatile memory module. UE 150 may also maintain a list of PLMNs that the UE has found during prior system searches. This list of found PLMNs may be stored in an acquisition database.

Figure 2:
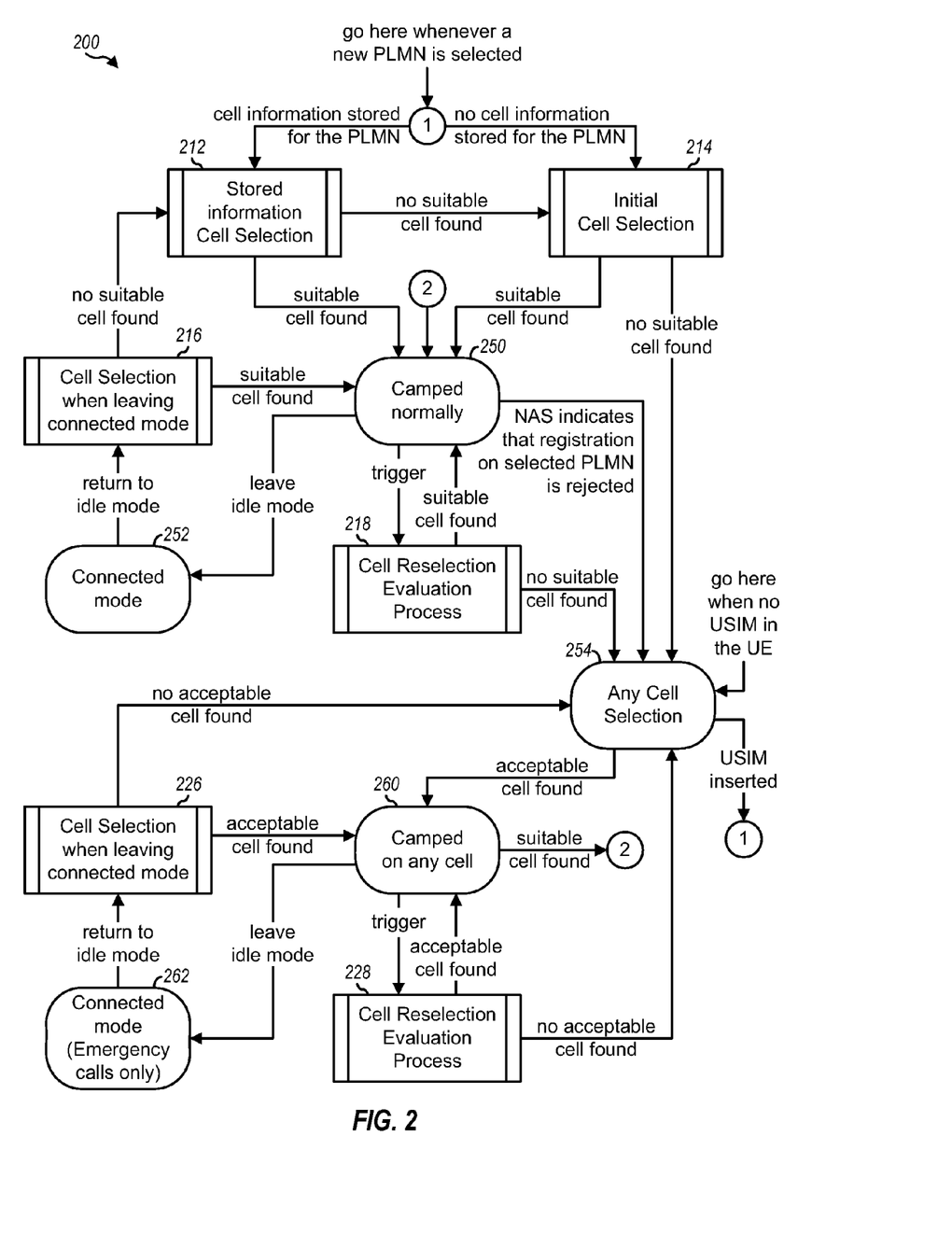
FIG. 2 shows a state diagram for cell selection and reselection by a UE.

FIG. 2 shows a state diagram 200 for cell selection and reselection by UE 150 while in an idle mode. A new PLMN may be selected by a Non-Access Stratum (NAS) at UE 150 or by a user. If UE 150 has cell information stored for the selected PLMN, then UE 150 may perform cell selection based on the stored cell information (block 212). If no cell information is stored for the selected PLMN, then UE 150 may perform initial cell selection (block 214). The cell selection in blocks 212 and 214 may include performing power scans to identify strong frequency channels, attempting acquisition on frequency channels with strong received power, etc., as described below.

If a suitable cell is found by the cell selection in block 212 or 214, then UE 150 may enter a Camped normally state 250 and camp on this suitable cell. In UMTS, a cell may be deemed as a suitable cell if it meets a set of criteria defined in Section 4.3 of 3GPP TS 25.304, entitled "User Equipment (UE) procedures in idle mode and procedures for cell reselection in connected mode," June 2006. In GSM, a cell may be deemed as a suitable cell if it meets a set of criteria defined in 3GPP TS 43.022, entitled "Functions related to Mobile Station in idle mode and group receive mode," September 2006. These documents are publicly available. UE 150 may obtain full/normal service while in state 250, e.g., receive and originate calls for all communication services covered by the service subscription for UE 150. UE 150 may transition to a Connected mode state 252 to obtain service and may perform cell selection after leaving state 252 (block 216). UE 150 may also perform cell reselection, when triggered, to select a better suitable cell to camp on (block 218).

If a suitable cell is not found in block 214 or 218 or if registration on the selected PLMN is rejected in state 250, then UE 150 may enter an Any cell selection state 254 and search for any acceptable cell. In UMTS, a cell may be deemed as an acceptable cell if it meets a set of criteria defined in Section 4.3 of 3GPP TS 25.304. If an acceptable cell is found, then UE 150 may enter a Camped on any cell state 260 and camp on this acceptable cell. UE 150 may obtain limited service while in state 260. UE 150 may transition to a Connected mode (Emergency calls only) state 262 to originate an emergency call and may perform cell selection after leaving state 262 (block 226). UE 150 may also perform cell reselection, when triggered, to select a better acceptable cell to camp on (block 228). UE 150 may regularly attempt to find a suitable cell while in state 260. If a suitable cell is found, then UE 150 may transition to Camped normally state 250. State diagram 200 and the various states and cell selection and reselection procedures are described in 3GPP TS 25.304.

UE 150 may operate in a discontinuous reception (DRX) mode while in the idle mode in state 250 or 260 in FIG. 2. The DRX mode may also be referred to as slotted mode paging. In the DRX mode, UE 150 may receive paging messages in designated time periods and may sleep during the remaining time in order to conserve battery power.

Figure 3:
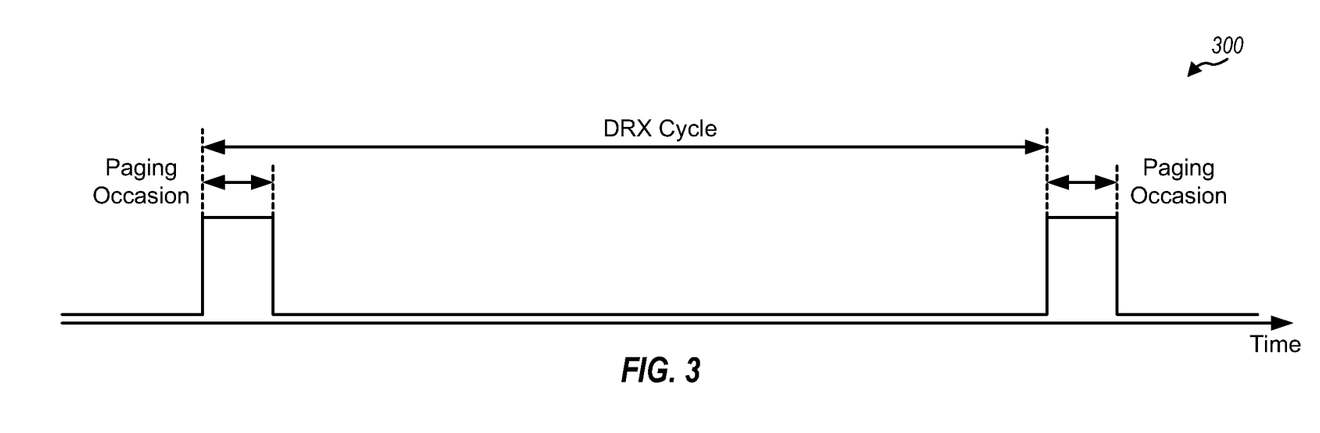
FIG. 3 shows a timeline for the UE while in a DRX mode of operation.

FIG. 3 shows a timeline 300 for UE 150 while in the DRX mode of operation. In UMTS, the system timeline is divided into radio frames. Each radio frame has a duration of 10 milliseconds (ms) and is identified by a 12-bit system frame number (SFN). The SFN is reset to 0 at a specific time, incremented by one for each frame thereafter, and reset to zero after reaching the maximum value of 4095.

In the DRX mode, UE 150 is assigned paging occasions, which are specific radio frames in which the UE can receive paging messages. The paging occasions for UE 150 are separated by a time interval called a DRX cycle. The DRX cycle is configurable for UE 150 and can range from 80 ms to 5.12 seconds, but is typically equal to 1.28 seconds. The paging occasions for UE 150 are determined based on several parameters such as an International Mobile Subscriber Identifier (IMSI) that is unique for the UE.

UE 150 may wake up periodically during its paging occasions to receive paging messages applicable for the UE. A paging message may be a unicast message directed to a specific UE, e.g., to inform the UE of an incoming call. A paging message may also be a multicast message for a group of UEs or a broadcast message for all UEs. For example, a broadcast paging message may provide updated system information for a cell. In any case, paging messages applicable for UE 150 are not sent to the UE outside of the assigned paging occasions. UE 150 may thus go to sleep during the time between its paging occasions if there are no other tasks to perform. UE 150 may power down as much circuitry as possible while asleep in order to conserve battery power.

In an aspect, UE 150 may periodically perform full service searches in background while the UE is camped on an acceptable cell with limited service. A full service search is a search for a suitable cell on which UE 150 may obtain full/normal service. In general, UE 150 may perform searches in background and/or foreground. For a search in background, UE 150 may perform search tasks to look for cells when no other tasks are to be performed. For a search in foreground, UE 150 may perform search tasks to look for cells without interruption and may delay other tasks until the search is completed. Performing full service searches in background may provide certain advantages, as described below.

While performing a full service search in background, UE 150 may continue to process a Page Indicator Channel (PICH) and a Paging Channel (PCH) to receive paging messages applicable for the UE. Since UE 150 can only receive limited service while camped on an acceptable cell, UE 150 will not receive paging messages for incoming calls. However, UE 150 may receive paging messages with updated system information that may indicate changes in the acceptable cell and/or convey other pertinent information.

Figure 4:
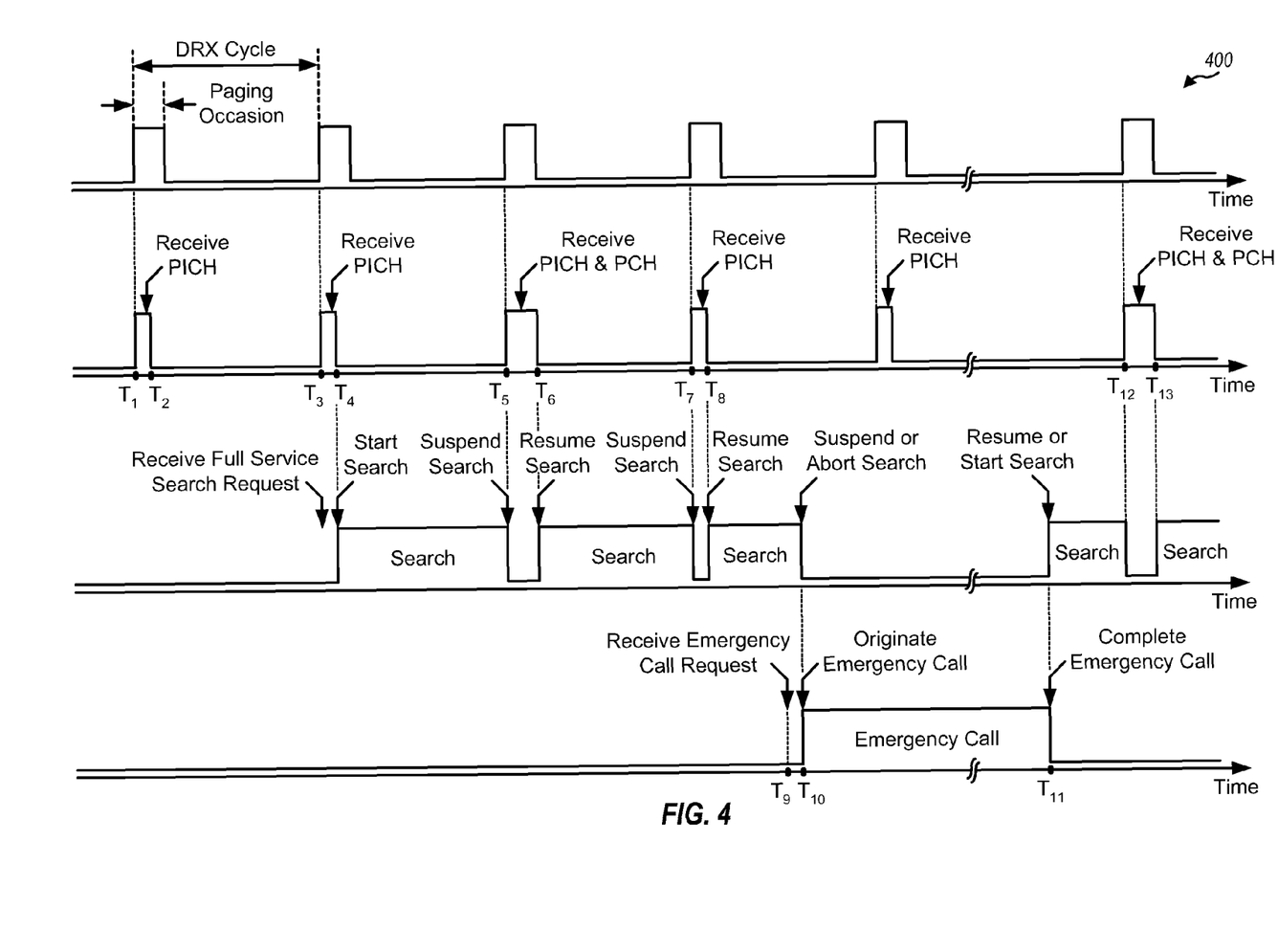
FIG. 4 shows a design of performing full service search in background.

FIG. 4 shows a design of performing full service search in background. UE 150 may be assigned paging occasions that may be separated by a particular DRX cycle. At time $T_1$, UE 150 may wake up and process the PICH to determine whether UE 150 might receive a paging message in the current paging occasion. UE 150 may be assigned a specific paging indicator on the PICH. This paging indicator may be set to '1' to indicate that UE 150 might receive a paging message in the current paging occasion or to '0' to indicate that UE 150 will not receive a paging message in the paging occasion. If the paging indicator is set to '0', then UE 150 may go back to sleep right away at time $T_2$. At time $T_3$, UE 150 may wake up and process the PICH and may determine that the assigned paging indicator is set to '0'. UE 150 may receive a request to perform a full service search and, instead of going to sleep at time $T_4$ after receiving the paging indicator, may start the full service search. UE 150 may perform the full service search until time $T_5$, which is the start of the next paging occasion. UE 150 may then suspend the full service search and save the current state of the search. UE 150 may process the PICH, determine that the assigned paging indicator is set to '1', and process the PCH to receive any paging messages applicable for the UE. After completing the processing of the PCH at time $T_6$, UE 150 may resume the full service search. At time $T_7$, which is the start of the next paging occasion, UE 150 may suspend the full service search and save the current state of the search. UE 150 may then process the PICH and determine that the assigned paging indicator is set to '0'. UE 150 may resume the full service search at time $T_8$ after receiving the paging indicator.

At time $T_9$, while performing the full service search, UE 150 may receive a request to originate an emergency call. UE 150 may then suspend or abort the full service search and originate the emergency call with the current acceptable cell at time $T_{10}$. After completing the emergency call at time $T_{11}$, UE 150 may resume the full service search (if it was suspended at time $T_{10}$) or may start a new full service search (if it was aborted at time $T_{10}$).

In general, a full service search may span any time duration and may cover one or more DRX cycles. If the full service search is not completed by the start of a paging occasion, then the search may be suspended and search state information may be saved for the search. The search state information may comprise information regarding which frequency channels have been scanned, frequency channels on which acquisition has been attempted, intermediate search results, etc. The full service search may be resumed based on the saved state information after completing the processing of the PICH and PCH to receive paging messages applicable for UE 150 and/or other tasks.

As shown in FIG. 4, UE 150 may perform a full service search in background when there are no other tasks to perform. UE 150 may continue to receive paging messages during its paging occasions and may suspend the full service search in order to process the PICH and PCH. This may ensure that UE 150 will have up-to-date system information, which may be used to (i) determine whether the current acceptable cell has become suitable or barred and/or (ii) perform searches more efficiently and possibly reduce battery power consumption. UE 150 may also interrupt the full service search in order to obtain limited service, e.g., to originate an emergency call.

While performing the full service search in background, UE 150 may also perform other tasks in addition to receiving paging messages. For example, UE 150 may make signal strength measurements for neighbor cells during and/or after the assigned paging occasions. UE 150 may detect a stronger acceptable cell than the current acceptable cell and may perform cell reselection to the stronger acceptable cell. By continuing to perform cell reselection procedures during its paging occasions, UE 150 may be able to remain on the strongest UMTS or GSM cell at all times.

UE 150 may periodically perform full service searches in background while camped on an acceptable cell with limited service. The time duration to complete one full service search may be dependent on various factors such as the number of radio access technologies to search, which radio access technologies (e.g., W-CDMA and/or GSM) to search, the number of frequencies and bands to search, radio frequency (RF) conditions, etc. The time interval between consecutive full service searches may be selected such that a suitable cell may be found as quickly as possible while reducing battery power consumption.

Figure 5A:
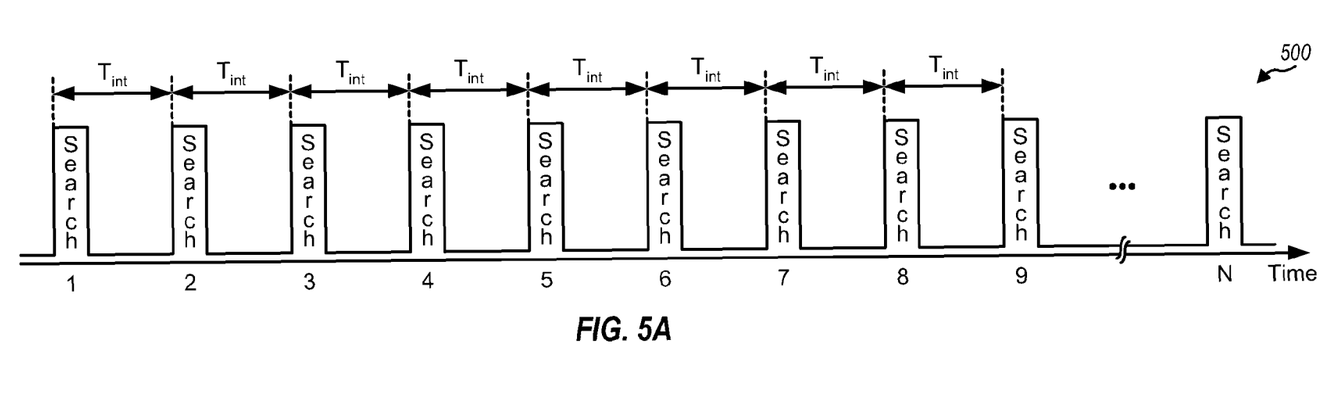
FIGS. 5A and 5B show two designs of performing full service searches with fixed search interval and telescopic search intervals, respectively.

FIG. 5A shows one design of performing full service searches in background. In this design, UE 150 may periodically perform full service searches with a fixed search interval, e.g., one full service search every $T_{int}$ seconds. The search interval $T_{int}$ may be an integer multiple of the DRX cycle, e.g., M times the DRX cycle. In this case, UE 150 may start a full service search every M-th DRX cycle. UE 150 may maintain a timer to determine when to start a new full service search.

Figure 5B:
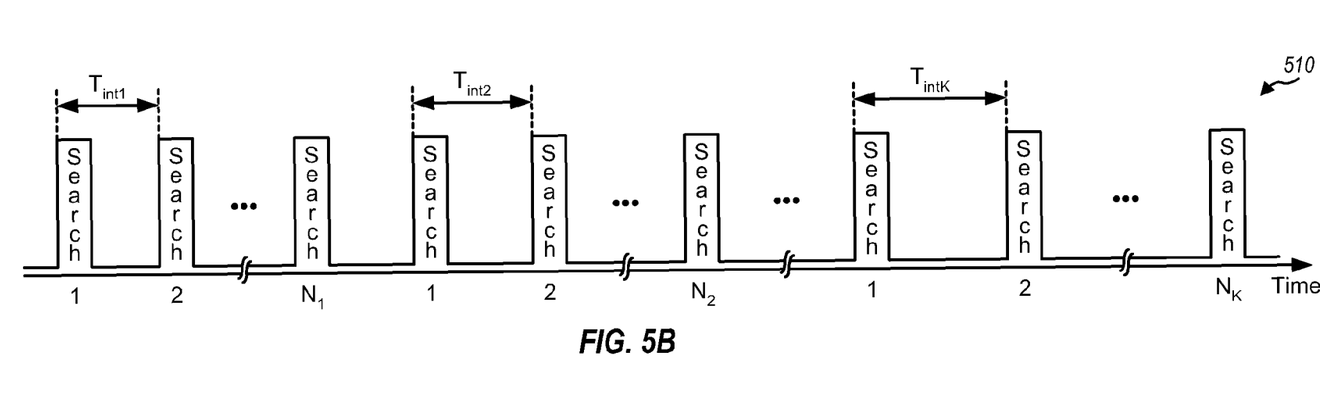

FIG. 5B shows another design of performing full service searches in background. In this design, UE 150 may perform telescopic full service searches with progressively longer search intervals. K stages may be defined, where K may be any integer value. Each stage k may cover a particular number of ($N_k$) full service searches that may be spaced apart by $T_{intk}$ seconds. For example, UE 150 may perform a full service search every $T_{int1}$ seconds for the first $N_1$ searches, then a full service search every $T_{int2}$ seconds for the next $N_2$ searches, and so on, and then a full service search every $T_{intK}$ seconds for the next $N_K$ searches. The search intervals may be selected such that $T_{int1} < T_{int2} < \ldots < T_{intK}$. This would then result in the full service searches being performed (i) more frequently at the start in order to possibly find a suitable cell earlier and (ii) less frequently later in order to conserve battery power since the likelihood of finding a suitable cell may be lower. $N_1$ through $N_K$ may be any integer values. $N_K$ may also be set to infinity so that full service searches may be performed periodically and perpetually while UE 150 is camped on an acceptable cell.

FIGS. 5A and 5B show two designs of performing periodic full service searches in background. Full service searches may also be performed in other manners. For example, a fixed search interval $T_{int}$ or telescopic search intervals $T_{int1}$ through $T_{intK}$ may be selected based on the available battery power at UE 150.

Performing periodic full service searches in background when UE 150 is camped on an acceptable cell with limited service may provide certain advantages. First, UE 150 can originate an emergency call right away on the acceptable cell. If the full service search is performed in foreground, then there may be a long delay before the search is completed and the emergency call can be originated. The delay may be especially long if the search is performed for multiple radio access technologies and/or multiple frequency bands. The delay may also be unnecessary if UE 150 is searching for full service on UMTS while limited service is available only on GSM, and vice versa. Second, UE 150 can continue to monitor for paging messages and receive updated system information by performing the full service searches in background. The updated system information may indicate changes in the status of the acceptable cell on which UE 150 is camped, and UE 150 may be able to obtain full service via this cell. The updated system information may also indicate that the acceptable cell has become barred and that even limited service may be unattainable via this cell. UE 150 may then search for another cell and may avoid making unnecessary signal strength measurements for the barred cell for a specified barred timer duration. This may reduce battery power consumption and increase standby time of UE 150.

UE 150 may perform a full service search in various manners. In one design, a full service search may include one or more of the following:
  Acquisition database search—a search using information for previously acquired frequencies and PLMNs,
  Partial scan search—a search over a limited number of frequency channels and/or bands, and
  Full scan search—a search over all supported frequency channels and bands.

UE 150 may maintain an acquisition database that may store information for frequency channels and PLMNs that have been acquired previously by the UE. A frequency channel may be identified by a UARFCN (UTRA absolute radio frequency channel number) in UMTS. The acquisition database may include a list of unique UARFCN/PLMN entries for frequency channels and PLMNs that have been previously acquired by the UE. Each entry may indicate a UARFCN, a scrambling code, PLMN ID information, and/or other pertinent information to acquire the associated frequency channel and PLMN. The acquisition database may include a predetermined number of (e.g., 10) entries for the most recently acquired frequency channels and PLMNs. These entries may be stored in a circular buffer so that a new entry replaces the oldest entry in the acquisition database.

UE 150 may perform an acquisition database search using the information in the acquisition database. UE 150 may also perform a partial scan search and/or a full scan search by making measurements on different frequency channels to detect for cells, as described below.

UE 150 may perform a full service search for a PLMN list containing one or more specific PLMNs. For example, the PLMN list may include any of the PLMNs in the preferred list provisioned at the UE. In one design, the PLMN list may include a last registered PLMN (RPLMN) and the HPLMN.

In one design, UE 150 may perform an acquisition database search followed by a full scan search for a full service search. This may be beneficial for several reasons. First, UE 150 has previously acquired the frequency channels and PLMNs in the acquisition database, so the likelihood of acquiring these frequency channels and PLMNs again may be good. Second, UE 150 may have pertinent information such as scrambling code and may be able to acquire these frequency channels and PLMNs more quickly. Third, UE 150 may use the results of the acquisition database search to reduce the search space for the full scan search, e.g., to avoid acquisition attempts on frequency channels where cells will not be present.

For an acquisition database search, UE 150 may first identity UARFCN/PLMN entries in the acquisition database for all PLMNs in the PLMN list. UE 150 may then form a UARFCN list containing all frequency channels in the identified UARFCN/PLMN entries. UE 150 may then attempt acquisition on each frequency channel in the UARFCN list. For W-CDMA, UE 150 may attempt acquisition on a frequency channel using a 3-step process. In step one, UE 150 may search for a 256-chip primary synchronization code (PSC) sequence sent on a primary synchronization channel (SCH) by correlating the received samples at the UE for the frequency channel with a locally generated PSC sequence at different time offsets. UE 150 may use the PSC to detect for the presence of cells and to ascertain the slot timing of each cell. In step two, UE 150 may determine a pattern of secondary synchronization code (SSC) sequences used by each cell for which the PSC has been detected. UE 150 can determine frame timing and a scrambling code group for a cell based on the detected SSC pattern for that cell. In step three, UE 150 may determine the scrambling code used by each cell for which the SSC pattern has been detected. Each SSC pattern is associated with a group of eight scrambling codes. UE 150 may evaluate each of the eight scrambling codes to determine which scrambling code is used by the cell.

For each cell acquired by the 3-step process, UE 150 may receive a master information block (MIB) from that cell and may extract the PLMN ID of the PLMN to which the cell belongs. If the PLMN ID of an acquired cell matches the PLMN ID of any PLMN in the PLMN list, then UE 150 may save this cell as a potential suitable cell. UE 150 may stop after finding any potential suitable cell or may complete the acquisition database search to find all potential suitable cells. UE 150 may obtain a list of potential suitable cells and/or a list of acquired cells from the acquisition database search.

UE 150 may obtain full system information from a potential suitable cell and may then attempt to register via the cell. If the registration is successful, then UE 150 may perform cell reselection to the suitable cell and terminate the full service search. If the registration is unsuccessful, then UE 150 may repeat the processing for each remaining potential suitable cell until registration is successful or all potential suitable cells have been considered. If no potential suitable cell is found by the acquisition database search or if registration is not successful on any potential suitable cell, then UE 150 may perform a full scan search.

UE 150 may perform a full scan search for one frequency band as follows:
  Perform a coarse frequency scan across the entire frequency band and measure the received power at coarse frequencies (e.g., spaced apart by 2 MHz) and identify strong coarse frequencies,
  Perform a fine frequency scan for a range of UARFCNs around each strong coarse frequency and identify strong UARFCNs,
  Attempt acquisition on each strong UARFCN, e.g., using the 3-step process, and
  Obtain the PLMN ID of each PLMN found, e.g., by reading the MIB of each acquired cell.

UE 150 may repeat the processing described above for each frequency band to be searched. UE 150 may obtain a list of potential suitable cells and/or a list of acquired cells for the full scan search for all frequency bands of interest. UE 150 may attempt to register on a potential suitable cell and, if the registration is successful, may perform cell reselection to the suitable cell.

In general, UE 150 may perform a full service search for any number of radio access technologies and any radio access technology, e.g., depending on the UE capabilities and/or other factors. For example, UE 150 may perform a full service search for only W-CDMA, or only GSM, or both W-CDMA and GSM. Search and acquisition for GSM may be performed in a manner known in the art.

UE 150 may perform system searches to find a suitable cell to receive full service while operating in the idle mode and camping on a cell with limited service, as described above. UE 150 may also perform system searches to find a suitable cell to receive full service while operating in a connected mode and receiving limited service via a current serving cell. For UMTS, UE 150 may receive limited service while operating in a CELL_FACH state, a CELL_PCH state, or a URA_PCH state in a Radio Resource Control (RRC) connected mode. UE 150 may then perform the system searches as described above find a suitable serving cell to receive full service. The RRC states and modes are described in 3GPP TS 25.331, entitled "Radio Resource Control (RRC); Protocol Specification," Release 7, June 2006, which is publicly available.

Figure 6:
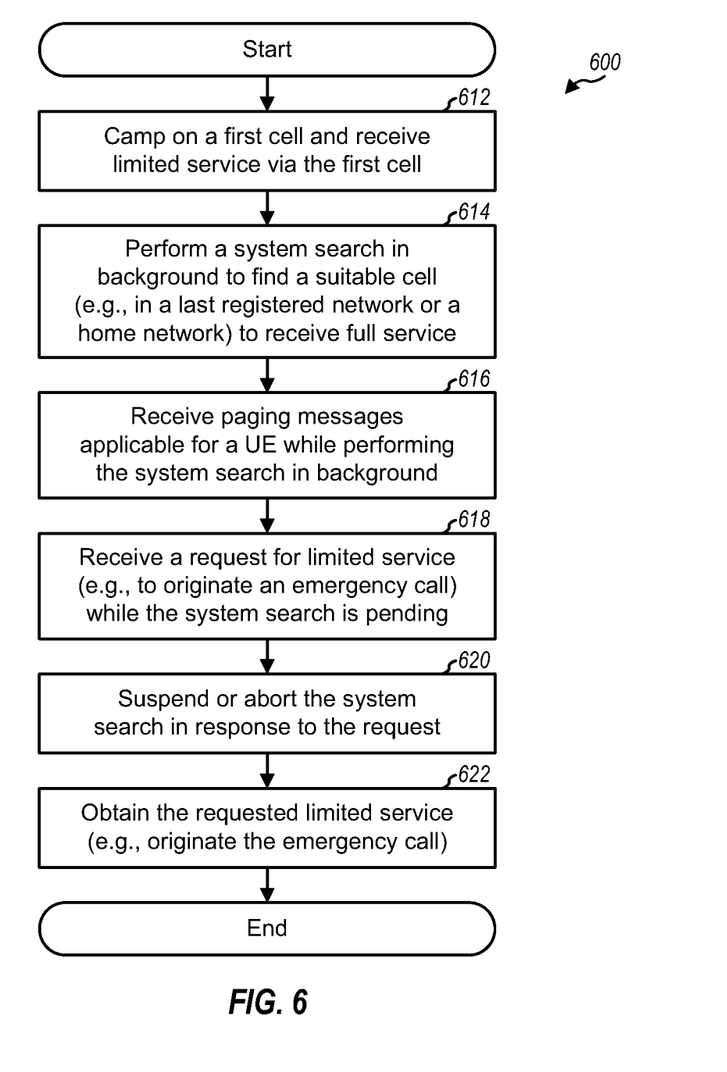
FIG. 6 shows a process performed by the UE for full service search.

FIG. 6 shows a design of a process 600 performed by UE 150 for full service search. Initially, UE 150 may camp on a first cell and receive limited service via the first cell (block 612). UE 150 may perform a system search in background to find a suitable cell to receive full service, e.g., a suitable cell in a last registered network or a home network (block 614). UE 150 may continue to receive paging messages applicable for the UE while performing the system search in background (block 616).

For blocks 614 and 616, UE 150 may perform the system search over a time period covering multiple paging occasions for the UE. UE 150 may suspend the system search prior to each paging occasion, save search state information, receive paging messages applicable for the UE, and then resume the system search based on the saved search state information. For the system search in background, UE may perform a first search in background based on information stored in an acquisition database for frequency channels and networks acquired recently by the UE. Alternatively or additionally, UE 150 may perform a second search in background by scanning a set of frequency channels and attempting acquisition on each frequency channel received with sufficient signal strength. UE 150 may communicate with the first cell via a first radio access technology (e.g., W-CDMA or GSM) and may perform the system search in background for the first radio access technology and possibly one or more additional radio access technologies.

UE 150 may periodically perform system searches in background spaced apart by a predetermined search interval or progressively longer search intervals. For example, UE 150 may perform a first set of system searches in background spaced apart by a first search interval and may perform a second set of system searches in background spaced apart by a second search interval that is longer than the first search interval.

UE 150 may make signal strength measurements for neighbor cells during paging occasions for the UE. UE 150 may identify a second cell that is stronger than the first cell based on the signal strength measurements and may perform cell reselection to the second cell. This may ensure that UE 150 can continue to receive limited service from the strongest acceptable cell.

By performing the system search in background, UE 150 can receive limited service with little or no delay when requested by a user. UE 150 may receive a request for limited service while the system search is pending (block 618). UE 150 may then suspend or abort the system search in response to the request (block 620) and may obtain the requested limited service (block 622). For example, UE 150 may receive a request to originate an emergency call while the system search is pending. UE 150 may then suspend or abort the system search and originate the emergency call.

UE 150 may receive a paging message with system information indicating that the first cell has become suitable to receive full service. UE 150 may then attempt registration via the first cell and may abort the system search if pending and if the registration is successful. Conversely, UE 150 may receive a paging message with system information indicating that the first cell has become barred. UE 150 may then attempt to find another cell to receive service and may skip making signal strength measurements for the frequency channel of the first cell.

Figure 7:
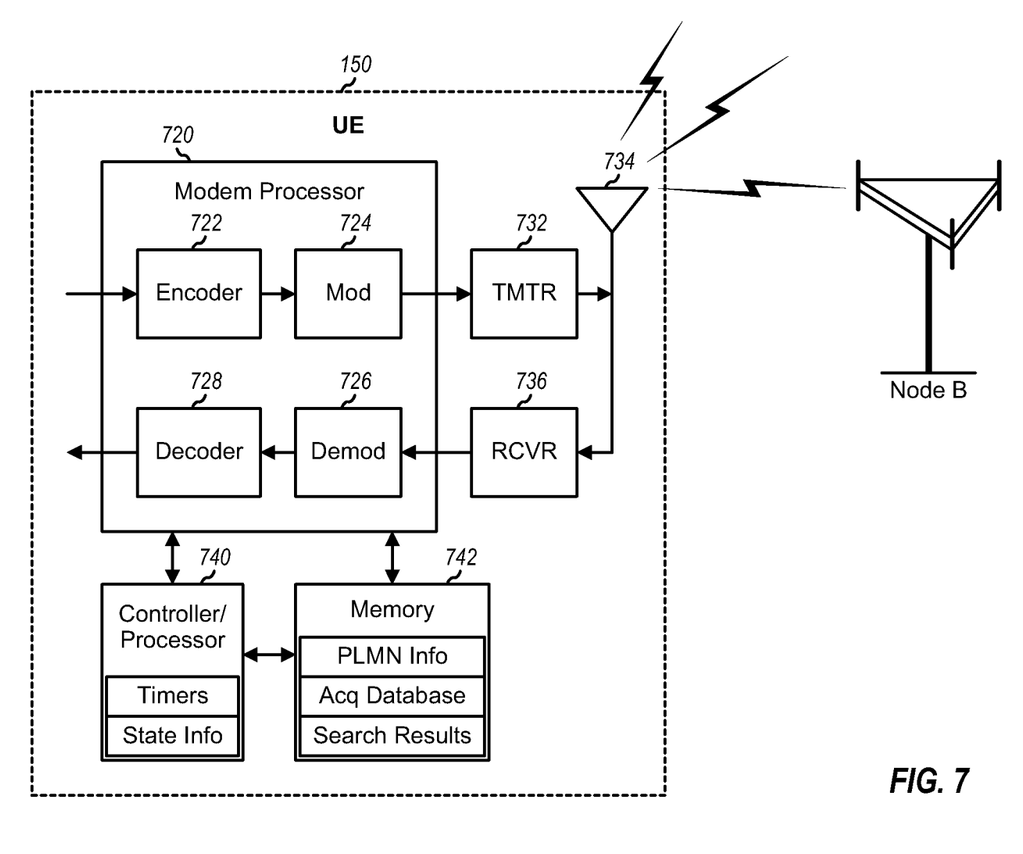
FIG. 7 shows a block diagram of the UE.

FIG. 7 shows a block diagram of a design of UE 150. On the uplink, an encoder 722 may receive and process (e.g., format, encode, and interleave) data and signaling to be sent by UE 150. A modulator (Mod) 724 may further process (e.g., modulate, channelize, and scramble) the encoded data and signaling in accordance with an applicable radio access technology (e.g., W-CDMA, GSM, or cdma2000) to obtain output chips. A transmitter (TMTR) 732 may then condition (e.g., convert to analog, filter, amplify, and frequency upconvert) the output chips and generate an uplink signal, which may be transmitted via an antenna 734.

On the downlink, antenna 734 may receive downlink signals transmitted by the Node Bs and provide a received signal. A receiver (RCVR) 736 may condition (e.g., filter, amplify, frequency downconvert, and digitize) the received signal and provide samples. A demodulator (Demod) 726 may process (e.g., descramble, channelize, and demodulate) the samples and provide symbol estimates. A decoder 728 may further process (e.g., deinterleave and decode) the symbol estimates and provide decoded data. Encoder 722, modulator 724, demodulator 726, and decoder 728 may be implemented by a modem processor 720. These units may perform processing in accordance with the radio access technology (e.g., W-CDMA, GSM, or cdma2000) used by each wireless network being received by UE 150. For example, demodulator 726 may perform descrambling with scrambling sequences, despreading with orthogonal variable spreading factor (OVSF) codes, and data demodulation for W-CDMA. Demodulator 726 may perform matched filtering and equalization for GSM.

A controller/processor 740 may control the operation at UE 150. A memory 742 may store data and program codes for UE 150. Controller/processor 740 may implement process 600 in FIG. 6 and/or other processes to perform full service searches. Controller/processor 740 may determine when to perform full service searches, which PLMNs to search, which frequencies and bands to search, etc. Controller/processor 740 may implement timers to determine paging occasions for the UE, when to perform searches, when to suspend searches, etc. Controller/processor 740 and/or memory 742 may store search state information for a full service search that is in progress. Memory 742 may also store PLMN information, the acquisition database, search results, etc.

For clarity, the techniques have been specifically described for UMTS and GSM. The techniques may also be used for other wireless networks such as cdma2000 networks, wireless local area networks (WLANs), etc. The techniques may be used for any number of radio access technologies, e.g., for UMTS only, for GSM only, for UMTS and GSM, for UMTS and cdma2000, or for some other combination of radio access technologies.

The techniques described herein may be implemented by various means. For example, the techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions/code may be stored in a memory (e.g., memory 742 in FIG. 7) and executed by a processor (e.g., processor 740). The memory may be implemented within the processor or external to the processor. The firmware and/or software instructions/code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The instructions/code may be executable by one or more processors and may cause the processor(s) to perform certain aspects of the functionality described herein.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:
a receiver;
at least one processor configured to:
camp on a first cell and receive limited service via the first cell, wherein the limited service includes capability to originate emergency calls using the first cell;
perform a system search to find a suitable cell to receive full service, wherein the system search to find a suitable cell to receive full service is performed in background during the limited service such that search tasks are performed when no other tasks are to be performed;
process paging messages detected by the receiver while the system search is suspended, wherein the paging messages are received during user equipment-specific paging occasions assigned to a specific user equipment, wherein the system search is resumed based on search state information after the one or more paging occasions; and
in response to a first paging message of the paging messages indicating that the first cell has become barred, refrain from performing signal strength measurements of signals from a base station of the first cell during a barred timer duration; and
a memory coupled to the at least one processor.

2. The apparatus of claim 1, wherein the at least one processor is configured to perform the system search over a time period covering multiple paging occasions, and to suspend the system search prior to each of the multiple paging occasions to process the paging messages detected by the receiver.

3. The apparatus of claim 2, wherein the at least one processor is configured to save search state information prior to each paging occasion and to resume the system search based on the saved search state information after the paging occasion.

4. The apparatus of claim 1, wherein the memory is configured to store an acquisition database including N entries, wherein N is an integer greater than 1, wherein each of the N entries includes information regarding a frequency channel and a previously acquired network, and wherein for the system search the at least one processor is configured to perform a first search based on the N entries in the acquisition database.

5. The apparatus of claim 4, wherein for the system search the at least one processor is configured to perform a second search by scanning a set of frequency channels and attempting acquisition on each frequency channel received with sufficient signal strength.

6. The apparatus of claim 4, wherein the apparatus is further configured to attempt acquisition on each frequency channel in a universal terrestrial radio access (UTRA) absolute radio frequency channel number list (UARFCN), comprising searching for a 256-chip primary synchronization code (PSC) sequence sent on a primary synchronization channel (SCH) by correlating received samples at the UE for each channel frequency with a locally generated PSC sequence at different time offsets.

7. The apparatus of claim 1, wherein the at least one processor is configured to perform the system search to find a suitable cell in a last registered network or a home network.

8. The apparatus of claim 1, wherein the at least one processor is configured to periodically perform system searches spaced apart by a predetermined search interval.

9. The apparatus of claim 1, wherein the at least one processor is configured to perform system searches spaced apart by progressively longer search intervals, wherein the search intervals are spaced apart based on available battery power.

10. The apparatus of claim 1, wherein the at least one processor is configured to communicate with the first cell via a first radio access technology and to perform the system search for the first radio access technology and at least one additional radio access technology.

11. The apparatus of claim 1, wherein the at least one processor is configured to:

perform signal strength measurements of signals from base stations of neighbor cells during paging occasions, the signals detected by the receiver, identify a second cell stronger than the first cell based on the signal strength measurements, and perform cell reselection to the second cell.

12. The apparatus of claim 1, wherein the at least one processor is configured to receive a request for limited service while the system search is pending, to suspend or abort the system search in response to the request, and to obtain the requested limited service.

13. The apparatus of claim 1, wherein the at least one processor is configured to receive a request to originate an emergency call while the system search is pending, to suspend or abort the system search in response to the request, and to originate the emergency call.

14. The apparatus of claim 1, wherein the at least one processor is configured to receive a paging message with system information indicating the first cell has become suitable to receive full service, to attempt registration via the first cell, and to abort the system search if pending and if the registration is successful.

15. The apparatus of claim 1, wherein the at least one processor is configured to perform the system search while operating in an idle mode and camping on the first cell.

16. The apparatus of claim 1, wherein the at least one processor is configured to perform the system search while operating in a connected mode and receiving limited service via the first cell.

17. The apparatus of claim 1, wherein the at least one processor is configured to perform a first set of system searches spaced apart by a first search interval, and to perform a second set of system searches spaced apart by a second search interval longer than the first search interval, and wherein the first set of system searches is of a different type than the second set of system searches.

18. The apparatus of claim 1, wherein the at least one processor is configured to perform telescopic full service searches with progressively longer search intervals.

19. A method comprising:

camping on a first cell and receiving limited service via the first cell, wherein the limited service includes capability to originate emergency calls using the first cell;

performing a system search to find a suitable cell to receive full service, wherein the system search to find a suitable cell to receive full service is performed in background during the limited service such that search tasks are performed when no other tasks are to be performed;

processing paging messages detected by a receiver while the system search is suspended, wherein the paging messages are received during user equipment-specific paging occasions assigned to a specific user equipment, wherein the system search is resumed based on search state information after the one or more paging occasions; and in response to a first paging message of the paging messages indicating that the first cell has become barred, refrain from performing signal strength measurements of signals from a base station of the first cell during a barred timer duration.

20. The method of claim 19, wherein the performing the system search comprises:

performing the system search over a time period covering multiple paging occasions; and suspending the system search prior to each of the multiple paging occasions to process the paging messages detected by the receiver.

21. The method of claim 19, further comprising:

storing an acquisition database including N entries, wherein N is an integer greater than 1, wherein each of the N entries includes information regarding a frequency channel and a previously acquired network, wherein performing the system search comprises performing a first search based on the N entries in the acquisition database.

22. The method of claim 21, wherein the performing the system search further comprises performing a second search by scanning a set of frequency channels and attempting acquisition on each frequency channel received with sufficient signal strength.

23. The method of claim 19, further comprising:

receiving a request to originate an emergency call while the system search is pending;

suspending or aborting the system search in response to the request; and originating the emergency call.

24. The method of claim 19, further comprising:

receiving a paging message with system information indicating that the first cell has become suitable to receive full service;

attempting registration via the first cell; and aborting the system search if pending and if the registration is successful.

25. The method of claim 19, further comprising:

performing a first set of system searches spaced apart by a first search interval; and performing a second set of system searches spaced apart by a second search interval longer than the first search interval, wherein the first set of system searches is of a different type than the second set of system searches.

26. An apparatus comprising:

means for camping on a first cell and receiving limited service via the first cell, wherein the limited service includes capability to originate emergency calls using the first cell;

means for performing a system search to find a suitable cell to receive full service, wherein the system search to find a suitable cell to receive full service is performed in background during the limited service such that search tasks are performed when no other tasks are to be performed;

means for processing paging messages detected by a receiver while the system search is suspended, wherein the paging messages are received during user equipment-specific paging occasions assigned to a specific user equipment, wherein the system search is resumed based on search state information after the one or more paging occasions; and means for refraining from performing signal strength measurements of signals received from a base station of the first cell during a barred timer duration in response to a first paging message of the paging messages indicating that the first cell has become barred.

27. The apparatus of claim 26, wherein the means for performing the system search comprises:

means for performing the system search over a time period covering multiple paging occasions; and means for suspending the system search prior to each of the multiple paging occasions to process paging messages detected by the receiver.

28. The apparatus of claim 26, further comprising:

means for receiving a request to originate an emergency call while the system search is pending;

means for suspending or aborting the system search in response to the request; and means for originating the emergency call.

29. The apparatus of claim 26, further comprising:

means for receiving a paging message with system information indicating that the first cell has become suitable to receive full service;

means for attempting registration via the first cell; and means for aborting the system search if pending and if the registration is successful.

30. The apparatus of claim 26, further comprising:

means for performing a first set of system searches spaced apart by a first search interval; and means for performing a second set of system searches spaced apart by a second search interval longer than the first search interval, wherein the first set of system searches is of a different type than the second set of system searches.

31. A non-transitory computer-readable medium storing instructions that, when executed by a processor, cause the processor to:

camp on a first cell and receive limited service via the first cell, wherein the limited service includes capability to originate emergency calls using the first cell;

perform a system search to find a suitable cell to receive full service, wherein the system search to find a suitable cell to receive full service is performed in background during the limited service such that search tasks are performed when no other tasks are to be performed;

process paging messages detected by a receiver while the system search is suspended, wherein the paging messages are received during user equipment-specific paging occasions assigned to a specific user equipment, wherein the system search is resumed based on search state information after the one or more paging occasions; and refrain from performing signal strength measurements of signals from a base station of the first cell during a barred timer duration in response to a first paging message of the paging messages indicating that the first cell has become barred.

32. The computer-readable medium of claim 31, further storing instructions that, when executed by the processor, cause the processor to:

perform the system search over a time period covering multiple paging occasions; and suspend the system search prior to each of the multiple paging occasions to process paging messages detected by the receiver.

33. The computer-readable medium of claim 31, further storing instructions that, when executed by the processor, cause the processor to:

receive a request to originate an emergency call while the system search is pending;

suspend or abort the system search in response to the request; and originate the emergency call.

34. The non-transitory computer-readable medium of claim 31, further storing instructions that, when executed by the processor, cause the processor to:

perform a first set of system searches spaced apart by a first search interval; and perform a second set of system searches spaced apart by a second search interval longer than the first search interval, wherein the first set of system searches is of a different type than the second set of system searches.

* * * * *